Nov. 10, 1925.
H. A. BONOFF
1,560,893
WAX AND COMPOUND ANNEALER
Filed Nov. 20, 1924
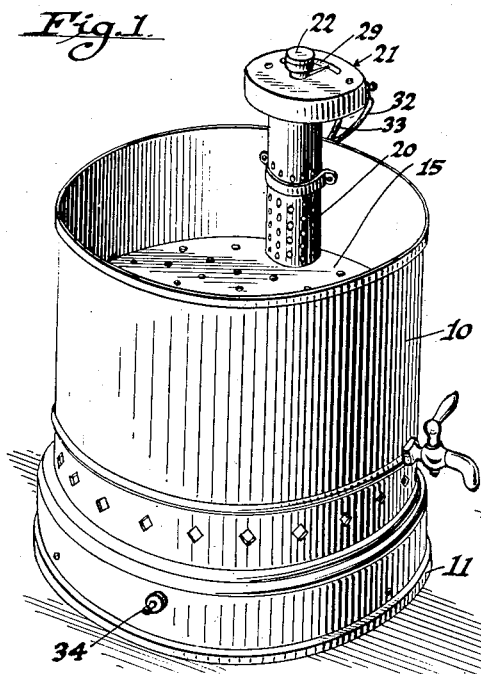
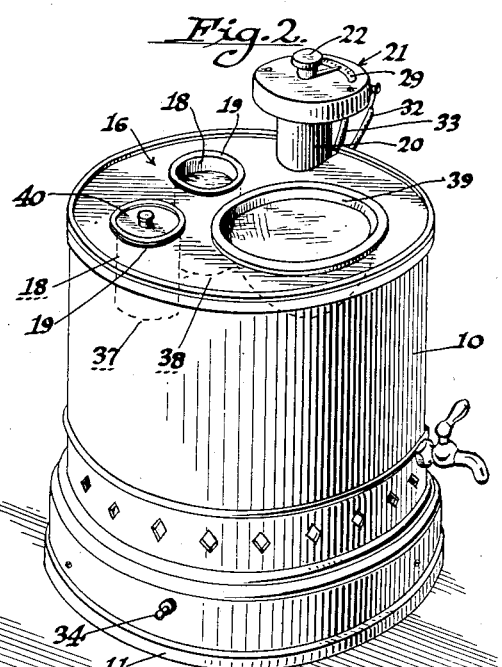
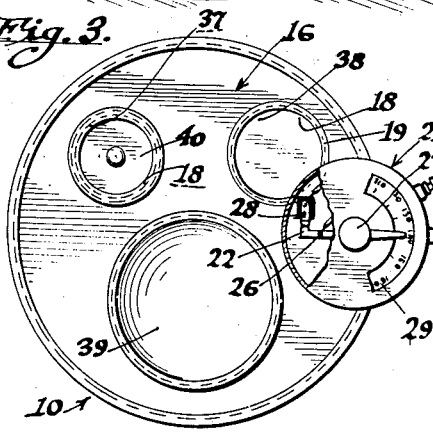
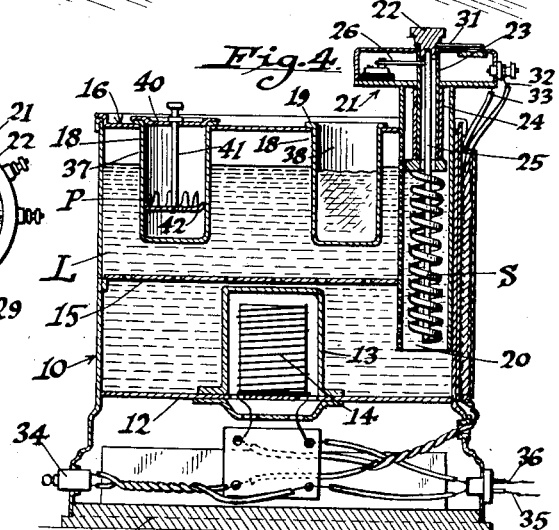
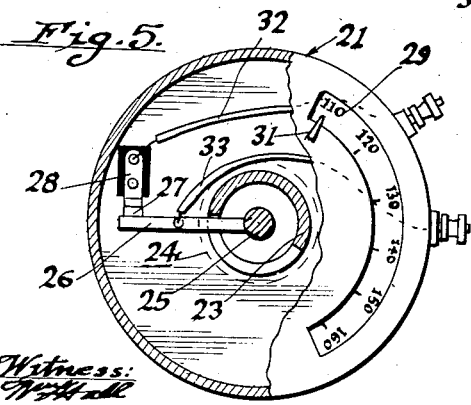
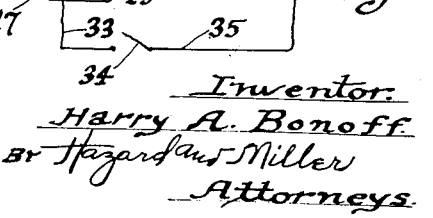
Inventor:
Harry A. Bonoff
By Hazard and Miller
Attorneys Patented Nov. 10, 1925.

1,560,893

UNITED STATES PATENT OFFICE.

HARRY A. BONOFF, OF LOS ANGELES, CALIFORNIA.

WAX AND COMPOUND ANNEALER.

Application filed November 20, 1924. Serial No. 751,095.

*To all whom it may concern:*

Be it known that I, HARRY A. BONOFF, a citizen of the United States, residing at Los Angeles, in the county of Los Angeles and State of California, have invented new and useful Improvements in Wax and Compound Annealers, of which the following is a specification.

This invention relates to improvements for devices for heating wax, waxy substances and compounds employed in dentistry, and is an improvement over the device disclosed in my prior Patent, No. 1,511,443, issued October 14, 1924.

In the device disclosed in my prior patent, there is a container containing a liquid which is adapted to be heated by an electric heating element, which heating element is regulated by an automatically operated device, so that the heating of the liquid within the container may be controlled and kept at a given predetermined temperature. In the device disclosed in my prior patent, the articles to be heated are placed directly within the liquid, and the method employed in heating these substances is commonly known as the wet method for softening the articles. Some dentists prefer to use what is known as a dry method for softening the wax or compound for the reason that the wax so heated may be placed upon a tray and will stay in position when so placed. In this method it is desirable to dip the wax or compound, after having been placed upon a tray or any suitable implements, within warm water, so that when the wax is placed in the patient's mouth, the surface burn of the wax will be removed because of the water.

It is therefore an object of this invention to provide such a device consisting of a container, a liquid within the container, and means for regulating the temperature of the liquid, and to provide cups which are suspended within the liquid, which cups are adapted to receive the wax, waxy substances or compound to be heated.

A further object of this invention is to provide a cup suspended within the liquid which is adapted to hold water which is to be heated to the same temperature as the waxy substances or compounds, so that after the waxy substances or compounds have been placed upon a tray or dental implement, they may be dipped into the water without raising or lowering their temperature.

With the foregoing and other objects in view which will be made manifest in the following detailed description and pointed out in the appended claims, reference is had to the accompanying drawings for an illustrative embodiment of the invention, wherein:

Figure 1 is a perspective view of the wax and compound annealer, the cover being shown as having been removed;

Fig. 2 is a perspective view of the annealer, the cover being shown in applied position;

Fig. 3 is a top plan view of the container or annealer;

Fig. 4 is a vertical section through the annealer;

Fig. 5 is a top plan view, parts being broken away, of the device for automatically regulating the temperature of the liquid; and Fig. 6 is a wiring diagram.

Referring to the accompanying drawings wherein similar reference characters designate similar parts throughout, the improved device consists of a cylindrical container 10 which may be mounted upon a suitable base 11, and which preferably has a raised bottom 12. Upon the raised bottom 12 there is secured a box 13 projecting upwardly within the container, which is adapted to receive an electric heating element 14. A perforated plate 15 is secured in the container above the box 13, which permits the liquid L within the container to readily pass therethrough to the upper compartment or to the lower compartment of the container.

Upon the top of the walls of the container 10 there is positioned a cover 16 which has one or more apertures formed therein, in which are adapted to be disposed cups 18 having flanges 19 around their tops adapted to engage the cover 16 and thus support or suspend the cups from the cover 16 within the liquid L. A perforated tube 20 is secured to the wall of the container 10 and extends downwardly within the liquid. Upon the top of the tube 20 is positioned a suitable box generally designated at 21. In the top of the box 21 is formed an aperture adapted to receive a thumb nut 22, which carries a sleeve 23 extending downwardly through the bottom of the box and into the tube 20. A sleeve 24 is secured to the bottom of the box 21 and is positioned about the sleeve 23, so as to maintain the sleeve 23 centrally within the tube 20. A rod 25 has its upper end journaled in the thumb nut 22 and extends downwardly within the sleeve 23 to a point adjacent the bottom of the tube 20.

A helical or coil spring S is secured to the rod 25 and to the lower end of the sleeve 23. The rod 25 carries an arm 26 which carries a contact 27 adapted to engage a contact 28 mounted upon the bottom of the box 21. The helical or coil spring S is what is known as a bimetallic spring, that is, that the material of which the spring is made, is formed of two metals secured together, which metals have different co-efficients of expansion under the action of heat.

Upon the top of the box 21 may be mounted a suitable scale 29, which is adapted to be traversed by a pointer 31 carried by the thumb nut 22. A wire 32 is connected to the contact 28 and to the heating element 14. A second wire 33 is connected to the contact 27 carried by the arm 26 and is connected to one terminal of a switch 34. The other terminal of the switch 34 is connected to a suitable supply wire 35, and the remaining terminal of the heating element 14 is connected to a second supply wire 36.

The operation of the device is as follows: When it is desired to heat the liquid L to a certain temperature and to maintain the temperature of the liquid at this degree, the thumb nut 22 is rotated which causes rotation of the sleeve 23, thereby tightening the spring S so that the spring urges rotation of the rod 25 and causes the contact 27 to bear against the contact 28. If the thumb nut 22 is rotated sufficiently to swing the pointer 31 opposite the scale division marked 110, the spring will be tightened a certain amount and will cause the contact 27 to engage the contact 28 with a certain corresponding pressure. If the switch 34 is closed, a circuit will be closed through the heating element 14 and thus cause the liquid L to become heated. As the temperature of the liquid L rises, the spring S will become heated, and because of the fact that the spring is formed of two different metals having different co-efficients of expansion, the spring S will become deformed, or in other words, will assume a different position from that in which it previously was, so that the spring will loosen and will cause the contact 27 to move away from the contact 28 when the temperature of the liquid L has reached 110 deg. This breaks the circuit through the heating element 14 and if the liquid cools below 110 deg., the spring S will tend to assume its original position and thereby force the contact 27 against the contact 28, thus causing the circuit through the heating element 14 to be again closed. In this manner the temperature of the liquid L may be maintained at any desired degree depending upon the rotation of the thumb nut 22. Friction keeps the sleeve 23 and the thumb nut 22 in position after having tightened the spring S.

As illustrated in Figs. 2 and 3, two of the cups may be comparatively small, as indicated at 37 and 38, while the third cup 39 is preferably of greater diameter. The third cup 39 is adapted to hold water and because of the fact that all three of the cups are suspended in the same liquid, the water within the cup 39 will have the same temperature as the temperature of the wax pellets or compound disposed within the cups 37 and 38. When the compound or wax is removed from either of the cups 37 and 38 and placed upon a tray or other dental instrument, it will easily adhere thereto because of the fact that it has been heated in a dry state. The tray with the wax or compound thereon is then dipped into the water within the cup 39 and may then be placed in the patient's mouth without causing surface burns. The cups 37 and 38 may both hold compound, if desired, or may both hold pellets, or one of the cups may hold pellets while the other holds compound. When it is desired to heat a wax pellet within one of the containers 37 or 38, a cup cover 40 is preferably provided, which cup cover has a rod 41 depending therefrom, which suspends a tray 42 within the cup, upon which is adapted to be placed one or more pellets P.

From the above, it is seen that an improved wax and compound annealer is provided, which consists essentially of a container adapted to hold a liquid, and means for automatically controlling or regulating the heating of the liquid. Cups are provided which are suspended from the cover for the container, in which wax pellets or compound may be heated in their dry state, and that one of the cups is adapted to hold water so that wax or compound, when ready to be applied, may be immersed in this cup to prevent the surface burning effect of the wax or compound without changing the temperature of the wax or compound.

It will be understood that various changes in the detail of construction may be made without departing from the spirit or scope of the invention as defined by the appended claims.

I claim:

1. A device for annealing wax, waxy substances and compositions for dental purposes comprising a liquid container, an electric heating element disposed beneath said container, automatically operated means for regulating the heating of a liquid in the container, a cover for said container, and cups depending from said cover into the container, said cups being adapted to hold articles to be heated.

2. A device for annealing wax, waxy substances and compositions for dental purposes comprising a liquid container, a heating element for said container, automatically operated means for regulating the heat of the liquid in the container, a cover for said container having an aperture formed therein, and a cup disposed in said aperture and depending into said container, said cup being adapted to be heated by the liquid in said container.

3. A device for annealing wax, waxy substances and compositions for dental purposes comprising a liquid container, a heating element for said container, automatically operated means for regulating the heat of a liquid in the container, a cover for said container having an aperture formed therein, a cup disposed in said aperture and depending into said container, said cup being adapted to be heated, a cup cover for said cup, and a tray adapted to be suspended from said cup cover within said cup upon which are adapted to be placed articles to be heated.

4. A device for annealing wax, waxy substances and compositions for dental purposes comprising a liquid container, a heating element for said container, automatically operated means for regulating the heating of a liquid in said container, a cover for said container, apertures formed in said cover, and cups suspended through said apertures into the liquid in said container, one of said cups being adapted to hold a liquid to be heated and the other cups being adapted to hold preparations to be heated.

In testimony whereof I have signed my name to this specification.

HARRY A. BONOFF.